United States Patent
Lenkala et al.

(10) Patent No.: US 12,437,301 B2
(45) Date of Patent: Oct. 7, 2025

(54) REAL-TIME UPDATING OF A SECURITY MODEL

(71) Applicant: Capital One Services, LLC, McLean, VA (US)

(72) Inventors: Shriyans Lenkala, Carpentersville, IL (US); Jonathan Barbalas, Chicago, IL (US); Joel Mampilly, Flushing, NY (US)

(73) Assignee: Capital One Services, LLC, McLean, VA (US)

( * ) Notice: Subject to any disclaimer, the term of this patent is extended or adjusted under 35 U.S.C. 154(b) by 279 days.

(21) Appl. No.: 17/140,680

(22) Filed: Jan. 4, 2021

(65) Prior Publication Data

US 2022/0215393 A1    Jul. 7, 2022

(51) Int. Cl.
*G06Q 20/40* (2012.01)
*G06N 20/00* (2019.01)
*G06Q 20/32* (2012.01)

(52) U.S. Cl.
CPC ......... *G06Q 20/4016* (2013.01); *G06N 20/00* (2019.01); *G06Q 20/3224* (2013.01); *G06Q 20/325* (2013.01); *G06Q 20/4015* (2020.05)

(58) Field of Classification Search
None
See application file for complete search history.

(56) References Cited

U.S. PATENT DOCUMENTS

| | | | |
|---|---|---|---|
| 10,482,441 B1* | 11/2019 | Watson | G06Q 20/202 |
| 11,386,357 B1* | 7/2022 | Kapoor | G06N 20/00 |
| 2010/0280950 A1* | 11/2010 | Faith | G06Q 30/0224 |
| | | | 705/44 |
| 2012/0233066 A1* | 9/2012 | Vallabhaneni | G06Q 40/02 |
| | | | 705/40 |
| 2017/0325056 A1* | 11/2017 | Mehta | H04W 4/02 |
| 2021/0233087 A1 | 7/2021 | Edwards et al. | |
| 2021/0383390 A1 | 12/2021 | Gupta | |
| 2022/0198337 A1* | 6/2022 | Nguyen | G06N 20/00 |
| 2022/0207865 A1* | 6/2022 | Muhammad | G11B 20/10379 |
| 2022/0245632 A1* | 8/2022 | Nicholson | G06Q 20/4016 |

* cited by examiner

*Primary Examiner* — Neha Patel
*Assistant Examiner* — Nicholas K Phan
(74) *Attorney, Agent, or Firm* — Harrity & Harrity, LLP

(57) ABSTRACT

In some implementations, a device may receive exchange information associated with an exchange initiated by a medium that indicates a first location associated with the exchange and may enable the exchange to be completed. The device may transmit, to the user device, an indication of the exchange and a request to indicate whether the exchange is fraudulent. The device may receive, from the user device, a response indicating whether the exchange is fraudulent that indicates a second location associated with the user device. The device may determine whether the response is valid based on a comparison between the first location and the second location. The device may determine whether the exchange is fraudulent based on the response and determining whether the response is valid. The device may train the model using the exchange information and an indication of whether the exchange is fraudulent as an input to the model.

20 Claims, 8 Drawing Sheets

REAL-TIME UPDATING OF A SECURITY MODEL

BACKGROUND

Machine learning involves computers learning from data to perform tasks. Machine learning algorithms are used to train machine learning models based on sample data, known as "training data." Once trained, machine learning models may be used to make predictions, decisions, or classifications relating to new observations. Machine learning algorithms may be used to train machine learning models for a wide variety of applications, including computer vision, natural language processing, financial applications, medical diagnosis, and/or information retrieval, among many other examples.

SUMMARY

In some implementations, a system for updating a security model using real-time feedback from a user device includes one or more memories and one or more processors, communicatively coupled to the one or more memories, configured to: receive, from the user device, user data that indicates at least one of a credential of a card associated with a user of the user device or an identifier associated with the user device; receive an indication of an exchange initiated using the credential of the card associated with the user data, wherein the indication identifies exchange data associated with the exchange; determine, using the security model, a score associated with the exchange based on the exchange data, wherein the score indicates a likelihood that the exchange is valid; enable the exchange to be completed using resources associated with the card if the score satisfies a first threshold and does not satisfy a second threshold; transmit, to the user device, a notification based on the score satisfying the first threshold, wherein the notification requests an indication of whether the exchange is valid; receive, from the user device, a response to the notification indicating whether the exchange is valid, wherein the response indicates user device location information associated with the user device; determine whether the response is valid based on the user device location and an exchange location indicated by the exchange data; and update the security model using data that identifies the exchange data and an indication of whether the exchange is valid that is based on the response to the notification and whether the response is valid.

In some implementations, a method for updating a model using real-time exchange information includes receiving, by a server device and from a user device, user information that indicates at least one of an identifier of a medium associated with a user of the user device or an identifier associated with the user device; receiving, by the server device, exchange information associated with an exchange initiated by the medium, wherein the exchange information indicates a first location associated with the exchange; enabling, by the server device, the exchange to be completed using resources of an account associated with the user; transmitting, by the server device and to the user device, an indication of the exchange and a request to indicate whether the exchange is fraudulent; receiving, by the server device and from the user device, a response indicating whether the exchange is fraudulent, wherein the response indicates a second location associated with the user device; determining, by the server device, whether the response is valid based on a comparison between the first location and the second location; determining, by the server device, whether the exchange is fraudulent based on the response and whether the response is valid; and training, by the server device, the model using the exchange information and an indication of whether the exchange is fraudulent as an input to the model to train the model.

In some implementations, a non-transitory computer-readable medium storing a set of instructions includes one or more instructions that, when executed by one or more processors of a user device, cause the user device to: transmit, to a server, an indication of a credential of a card associated with a user of the user device; receive, from the server, an indication of an exchange that was completed using the credential of the card; provide feedback indicating the exchange, wherein the feedback includes: haptic feedback, and a notification that indicates the exchange and a request to confirm or deny the exchange; receive an input indicating that the exchange is confirmed or denied based on providing the feedback; determine a location of the user device at a time that the input is received by the user device; and transmit, to the server, an indication of whether the exchange is confirmed or denied based on the input and the location of the user device at the time that the input is received by the user device.

DETAILED DESCRIPTION

Figure 1A:
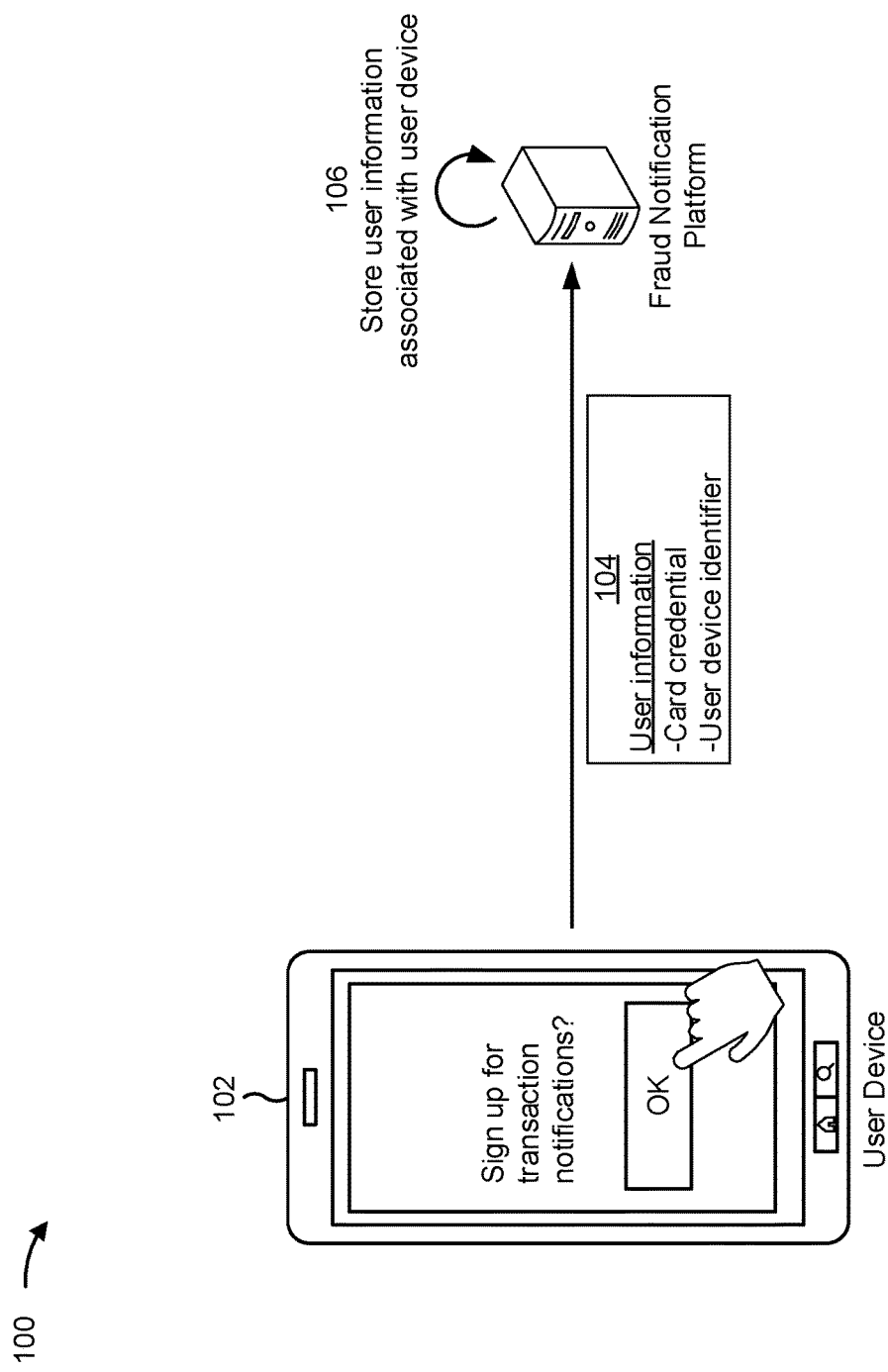
FIGS. 1A-1D are diagrams of an example implementation relating to real-time updating of a security model.

The following detailed description of example implementations refers to the accompanying drawings. The same reference numbers in different drawings may identify the same or similar elements.

When a financial institution receives a request to confirm a transaction initiated by a transaction card (e.g., a credit card, a debit card, a rewards card, and/or the like) issued by the financial institution, the financial institution may analyze transaction information (e.g., a transaction amount, a date and/or time, a geographic location, and/or a merchant or retailer) to determine whether the transaction information indicates a fraudulent transaction. For example, the financial institution may process the transaction information using a fraud model or a security model (e.g., a machine learning model) before approving the transaction. If the fraud model indicates that the transaction should be denied (e.g., indicates a likelihood that the transaction is fraudulent), then the financial institution may deny the transaction and/or notify a transaction backend system that the transaction should be denied.

Machine learning algorithms are used to train machine learning models that, once trained, may be used to make predictions, decisions, or classifications relating to new observations. For example, machine learning algorithms may be used to train a fraud model. However, once deployed, the fraud model may quickly become outdated. For example, the fraud model may analyze transaction information for a transaction and determine that the transaction information does not indicate a fraudulent transaction, for example, and thereby the transaction may be approved and/or completed. However, a user associated with the transaction may later identify that the transaction was in fact fraudulent. The user may notify the financial institution that the transaction is fraudulent. The financial institution may remedy the fraudulent transaction and may update the fraud model (e.g., machine learning algorithms may be used to train the fraud model based on the transaction information and an indication that the transaction is fraudulent). However, during the time between when the fraud model determines that the transaction information does not indicate a fraudulent transaction and when the fraud model is updated, the financial institution may apply an outdated fraud model to a number (e.g., tens, hundreds, thousands, or millions) of transactions. For example, in some cases, it may be days or weeks before the user identifies that the transaction is fraudulent and notifies the financial institution. As a result, the outdated fraud model may allow a number of fraudulent transactions to be completed as the fraud model has not been updated, as described above. This consumes computing resources and/or network resources associated with submitting, processing, investigating, and/or resolving fraud claims.

In some cases, when the fraud model determines that the transaction information indicates fraud, a device associated with the financial institution may cause an indication (e.g., a notification, a message, and/or an alert) to be provided to a user device associated with the transaction card used to initiate the transaction. The indication may request that a user of the user device confirm whether the transaction is fraudulent. The financial institution device may use the response (e.g., indicating whether the transaction is fraudulent) to determine whether to allow a subsequent transaction and/or to update the fraud model. However, in some cases, the device associated with the financial institution may transmit the indication only when the fraud model determines that the transaction information indicates fraud and/or when a transaction is not allowed (e.g., denied). Additionally, the user of the user device may attempt to deceive the financial institution by responding or reporting that a transaction is fraudulent when the transaction was in fact not fraudulent. As a result, the fraud model may be updated based on incorrect information (e.g., indicating that a transaction is fraudulent based on a false fraud claim). Moreover, when the user attempts to deceive the financial institution by reporting false fraud claims, computing resources and/or network resources are consumed associated with processing, investigating, and/or resolving false fraud claims.

Some implementations described herein enable real-time updating of a security model (e.g., a fraud model). A user may provide information to a platform indicating an identifier of a transaction device or a transaction card associated with the user and an identifier of a user device associated with the user. The platform may receive transaction information associated with a transaction initiated using the transaction device or the transaction card. The platform may apply a fraud model to the transaction information to determine a likelihood that the transaction is fraudulent. In some implementations, the platform may enable the transaction to be completed (e.g., based on a fraud score output by the fraud model not satisfying a fraud threshold). The platform may transmit, to the user device and within a threshold amount of time from the time that the transaction occurred, a notification indicating the transaction information and requesting that the user confirm or deny the transaction (e.g., indicating if the transaction is fraudulent). In some implementations, the platform may transmit the notification based on the fraud score satisfying a notification threshold (e.g., that is lower than the fraud threshold) and/or based on the user signing up for or requesting notifications of transactions initiated by the transaction device or the transaction card. The platform may receive, from the user device, a response to the notification confirming or denying the transaction.

The platform may update the fraud model, based on the response and the initial determination of the fraud score, in real time. For example, the platform may add the transaction information and an indication of whether the transaction is fraudulent to a data stream (e.g., an event stream). The data stream can be fed back to the fraud model in real time and can be used to train or update the fraud model (e.g., using machine learning algorithms). The trained or updated fraud model may be deployed immediately, enabling the platform to use an accurate and updated fraud model for future transactions. Because the notification is sent to the user device soon after (e.g., immediately after) the transaction is initiated or completed, the platform ensures that the user identifies, in real time, fraudulent transactions that were not identified by the fraud model. This eliminates the delay associated with the user identifying fraudulent transactions that were missed by the fraud model, as described above. As a result, the platform is enabled to update the machine learning fraud model in real time using the feedback from the user. This improves the security of transactions that are associated with the fraud model because the transaction will be analyzed by an updated and more accurate fraud model.

Additionally, the platform may be enabled to collect significantly more data points for updating the fraud model based on transmitting the notification even in situations where the transaction is completed. For example, as described above, previously the notification may only have been sent when the fraud model detects a likelihood of fraud and denies the transaction (e.g., based on the fraud score satisfying the fraud threshold). This results in a poor user experience if the transaction was in fact not fraudulent, as the transaction is denied and the user may have to retry the transaction or use alternative payment methods. In some implementations described herein, the platform may enable the transaction to be completed and also send the notification (e.g., based on the fraud score satisfying the notification threshold but not satisfying the fraud threshold and/or based on a user requesting the notifications). This may enable the platform to collect significantly more data points, as the threshold for transmitting the notification can be lowered (resulting in more transactions triggering the notification to be sent) and the transaction will still be completed, eliminating the risk of the poor user experience associated with a falsely declined transaction. Because the platform is enabled to collect more data points, the platform can more accurately update the fraud model, thereby improving the performance of the fraud model and increasing the security of transactions.

Further, in some implementations described herein, the platform may be enabled to detect whether the response from the user device is valid (e.g., the platform may be enabled to determine when a user is attempting to deceive the platform). For example, when the response is transmitted to the platform, the user device may transmit an indication of a user device location at the time when the response is transmitted. The platform may identify a transaction location based on the transaction information. The platform may compare the user device location to the transaction location (e.g., to determine if the user device and the transaction are co-located and/or to determine if the user device location and the transaction location are within a threshold distance of each other). Because the notification is sent to the user device soon after (e.g., immediately after) the transaction is initiated or completed, if the user device is located in a same location as (or within a threshold distance from) the transaction when the response is transmitted, it is likely that the transaction is not fraudulent because the user is in the same location as the transaction (e.g., in the store or physical location associated with the transaction and/or near a device used to complete the transaction). Therefore, for example, if the response indicates that the transaction is fraudulent (e.g., if the response indicates that the transaction is denied) and the platform determines that the user device location and the transaction location are near one another, then the platform may determine that the response is not valid. This enables the platform to detect when the response from the user device is attempting to deceive the platform and enables the platform to more accurately update the fraud model. Additionally, this conserves resources that would have otherwise been used processing, investigating, and/or resolving false fraud claims.

FIGS. 1A-1D are diagrams of an example 100 associated with real-time updating of a security model. As shown in FIGS. 1A-1D, example 100 includes a user device, a fraud notification platform, a transaction card, a transaction terminal, and a transaction backend system. These devices are described in more detail in connection with FIGS. 3 and 4.

As shown in FIG. 1A, a user of the user device may desire to receive notifications of transactions initiated by a transaction card (or a transaction device) associated with the user (e.g., transaction notifications). For example, as shown by reference number 102, the user may interact with the user device to provide an input indicating the desire to receive transaction notifications. In some implementations, an application (e.g., a payment application and/or an application associated with an institution that provides the transaction card (or the transaction device) associated with the user) may be executing on the user device. The user may provide the input indicating the desire to receive transaction notifications to the application executing on the user device. A "transaction" may be referred to herein as an exchange, an electronic exchange, a sale, a transfer, a purchase, and/or similar terms.

In some implementations, the input indicating the desire to receive transaction notifications may cause the user device to prompt the user to enter a credential associated with the transaction card or transaction device for which the user desires to receive transaction notifications. The credential may include an identifier, a card number, an expiration date, and/or security information (e.g., a security code, card verification data, and/or a card verification value), among other examples. In some implementations, the input indicating the desire to receive transaction notifications may cause the user device to prompt the user to enter an identifier of the user device or another device to which the user desires to have the transaction notifications transmitted. For example, the identifier may include a phone number, a Voice over Internet Protocol (VoIP) identifier, and/or an email address identifier, among other examples.

In some implementations, the user device may obtain the credential associated with the transaction card or transaction device and/or the identifier of the user device based on information stored by the user device. For example, the user may link or store the credential in a payment application (e.g., a digital wallet application) executing on the user device. The user device may obtain the credential from the payment application (e.g., without receiving an input from the user).

In some implementations, the input indicating the desire to receive transaction notifications may cause the user device to prompt the user to allow location sharing by the user device. For example, the user device may request that the user enable the user device to share a location of the user device with other devices (such as the fraud notification platform). In some implementations, the request may prompt the user to share the location of the user device at all times and/or only while an application (e.g., associated with the institution that provides the transaction card or the transaction device) is executing on the user device. In some implementations, the user device may require that the user provide an input enabling location sharing before the user device enables transaction notifications to be provided to the user (or the user device).

As shown by reference number 104, the user device may transmit, to the fraud notification platform, a request to provide transaction notifications and user information associated with the user and/or user device. The user information may include the credential associated with the transaction card (or transaction device), an identifier of the user device, an indication that location sharing is enabled, and/or a preferred method of notification (e.g., short message service (SMS) message, voice call, email notification, and/or a notification to be displayed by the user device), among other examples.

As shown by reference number 106, the fraud notification platform may receive the request to provide transaction notifications and the user information. The fraud notification platform may store the user information in a data structure. For example, the fraud notification platform may link or map the credential associated with the transaction card (or transaction device) to the identifier of the user device and/or other user information in the data structure. In some implementations, the fraud notification platform may transmit, to the user device, an indication that transaction notifications have been enabled for the transaction card (or transaction device) identified in the user information. The user device may provide or display a notification indicating that transaction notifications have been enabled based on receiving the indication from the fraud notification platform.

Figure 1B:
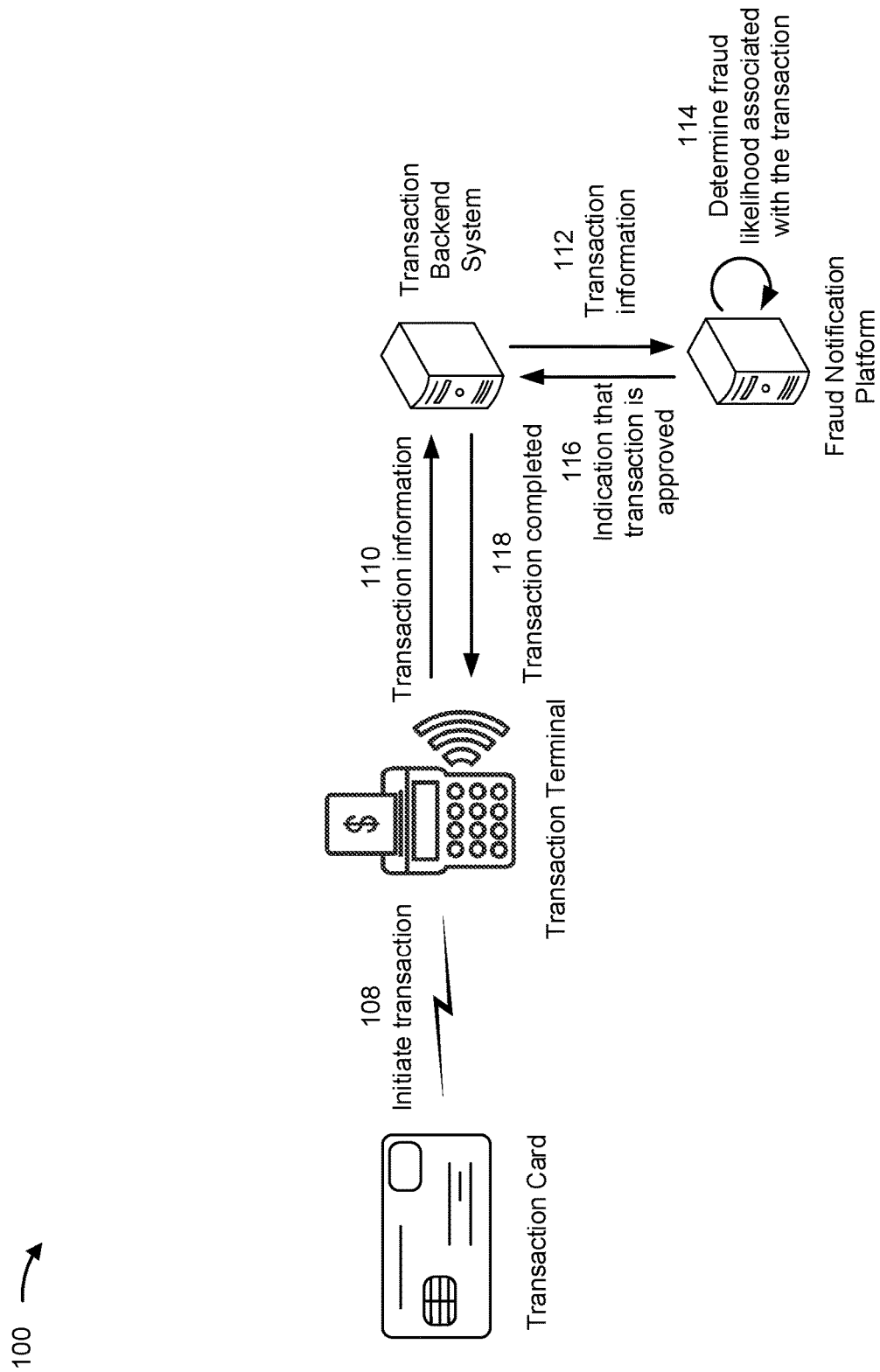

As shown in FIG. 1B, and by reference number 108, a transaction may be initiated using the credential associated with the transaction card (or transaction device). For example, the transaction card may communicate with a transaction terminal to initiate a transaction. In some implementations, the credential associated with the transaction card may be input to an online point of sale platform or web page. For example, the credential associated with the transaction card may be used to initiate an online or a remote (e.g., not in person) transaction via the user device or another device.

As shown by reference number 110, the transaction terminal may transmit, to the transaction backend system, transaction information associated with the transaction initiated using the credential associated with the transaction card. The transaction information may include information that identifies parties associated with the transaction, an indication of an item and/or a service being purchased, an amount of the transaction, a date and/or time of the transaction, and/or a location of the transaction (e.g., geographic coordinates and/or an address), among other examples. In some implementations, the transaction backend system may receive the transaction information in real-time or near real-time as the transaction is initiated.

As shown by reference number 112, the transaction backend system may transmit, to the fraud notification platform, an indication of the transaction information. For example, the transaction backend system may identify an institution associated with the transaction card. The transaction backend system may identify that the fraud notification platform is associated with the institution and may transmit the transaction information to the fraud notification platform. The transaction backend system may transmit a request for the fraud notification platform to confirm or approve the transaction based on the transaction information.

As shown by reference number 114, the fraud notification platform may determine a fraud likelihood associated with the transaction based on the transaction information. For example, the fraud notification platform may apply a fraud model (e.g., a machine learning model, as described in more detail below in connection with FIG. 2) to the transaction information (e.g., the transaction information may be provided as an input to the fraud model). The fraud model may output a fraud score that indicates a likelihood that the transaction is fraudulent. The fraud model may also be referred to herein as a security model.

The fraud notification platform may use the fraud score to determine whether to approve or deny the transaction. For example, the fraud notification platform may determine whether the fraud score satisfies a fraud threshold. If the fraud notification platform determines that the fraud score satisfies the fraud threshold (e.g., is equal to or greater than a value of the fraud threshold), then the fraud notification platform may determine that the transaction should be denied. If the fraud notification platform determines that the fraud score does not satisfy the fraud threshold (e.g., is less than a value of fraud threshold), then the fraud notification platform may determine that the transaction should be approved.

In some implementations, the fraud notification platform may determine whether a transaction notification should be provided to the user device (e.g., as described in more detail below). For example, the fraud notification platform may use the credential identified by the transaction information to search or parse the data structure to identify an entry indicating the credential (and/or determine if the data structure includes an entry indicating the credential). The fraud notification platform may determine that a transaction notification should be provided to the user device based on identifying an entry indicating the credential.

In some implementations, if the fraud notification platform identifies an entry indicating the credential, the fraud notification platform may determine that a transaction notification should be provided (e.g., regardless of the fraud score associated with the transaction). In some implementations, the fraud notification platform may determine whether a transaction notification should be provided based on the fraud score. For example, the fraud notification platform may determine whether the fraud score satisfies a notification threshold. If the fraud notification platform determines that the fraud score satisfies the notification threshold, then the fraud notification platform may determine that a transaction notification should be provided. If the fraud notification platform determines that the fraud score does not satisfy the notification threshold, then the fraud notification platform may determine that a transaction notification should not be provided.

In some implementations, a fraud score equal to a value of the notification threshold may indicate a lower likelihood of fraud than a fraud score equal to a value of the fraud threshold. For example, if the fraud model outputs fraud scores from 0 to 100, with 0 indicating a low likelihood of fraud and 100 indicating a high likelihood of fraud, then the value of the notification threshold may be lower than the value of the fraud threshold (e.g., the value of the fraud threshold may be 85 and the value of the notification threshold may be 60). In this way, the fraud notification platform may deny transactions when the fraud platform has a high degree of certainty that the transactions are fraudulent (e.g., based on the fraud score satisfying the fraud threshold). Additionally, the fraud notification platform may approve transactions and may obtain additional data points or further confirmation from a user when the fraud notification platform has a lower degree of certainty that the transactions are fraudulent (e.g., based on the fraud score satisfying the notification threshold). Further, the fraud notification platform may refrain from transmitting transaction notifications when the fraud platform has a high degree of certainty that the transactions are not fraudulent (e.g., based on the fraud score not satisfying the notification threshold) to conserve computing resources and/or network resources.

As shown by reference number 116, the fraud notification platform may transmit, to the transaction backend system, an indication that the transaction is approved if the fraud score does not satisfy the fraud threshold, as described above. For example, the fraud notification platform may determine that the fraud score satisfies the notification threshold but does not satisfy the fraud threshold. As a result, the fraud notification platform may transmit an indication that the transaction is approved (and may proceed with transmitting a transaction notification as described in more detail below).

The transaction backend system may complete the transaction using resources of an account associated with the transaction card based on receiving the indication that the transaction is approved (e.g., from the fraud notification platform). As shown by reference number 118, the transaction backend system may transmit, to the transaction terminal, an indication that the transaction has been successfully completed. The transaction terminal may indicate (e.g., to a user and/or the transaction card) that the transaction has been completed based on receiving the indication from the transaction backend system that the transaction has been successfully completed.

Figure 1C:
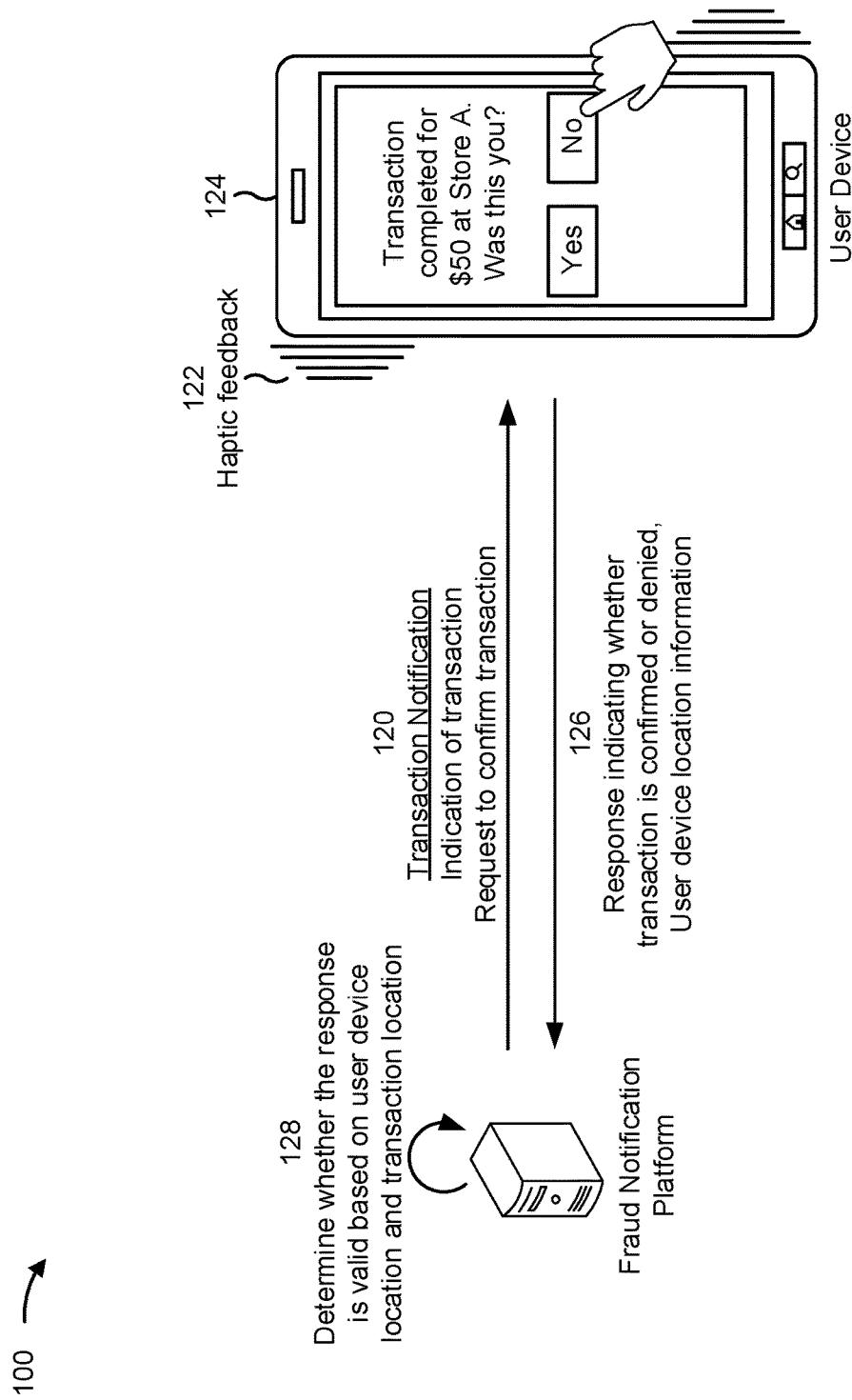

As shown in FIG. 1C, and by reference number 120, the fraud notification platform may transmit a transaction notification to the user device. The transaction notification may indicate transaction information and a request to confirm the transaction. As described above, in some implementations, the fraud notification platform may transmit the transaction notification based on identifying a transaction initiated using a credential of a transaction card or transaction device associated with the user device. In some implementations, the fraud notification platform may transmit the transaction notification based on determining that a fraud score associated with the transaction satisfies the notification threshold.

The fraud notification platform may transmit the transaction notification to the user device using an SMS message, a voice call (e.g., an automated voice call), a push notification, and/or an email message, among other examples. In some implementations, the fraud notification platform may transmit the transaction notification within a threshold amount of time from receiving the transaction information (e.g., from the transaction backend system as described above).

The user device may perform one or more actions based on receiving the transaction notification from the fraud notification platform. For example, as shown by reference number 122, the transaction notification may instruct the user device to provide haptic feedback to the user indicating the transaction notification. The haptic feedback may include vibration feedback, force feedback, and/or movement feedback, among other examples. Additionally, or alternatively, the transaction notification may instruct the user device to provide sound feedback (e.g., a sound alert and/or a ringtone) indicating the transaction notification. The feedback (e.g., the haptic feedback and/or the sound feedback) provided by the user device may alert the user of the user device that the user device has received a transaction notification. As a result, the user may be alerted to access the user device to inspect the transaction notification.

As shown by reference number 124, the user device may provide an indication of the transaction notification. For example, as shown in FIG. 1C, the user device may display an indication of the transaction (e.g., "Transaction completed for $50 at Store A."). In some implementations, the user device may display an indication of the transaction card or transaction device used to complete or initiate the transaction. The user device may display a request for the user to confirm or deny the transaction (e.g., "Was this you?"). In some implementations, the transaction notification may be provided via sound output device (e.g., a speaker) of the user device (e.g., if the transaction notification is provided as an automated voice call). As shown in FIG. 1C, the user device may display input options for the user to provide an input confirming or denying the transaction. For example, the input options may be "Yes" (confirming the transaction and/or indicating that the transaction is valid or not fraudulent) or "No" (denying the transaction and/or indicating that the transaction is not valid or is fraudulent). In some implementations, the input options may be an input option of an existing user interface of the user device (e.g., input "0" to confirm the transaction or "1" to deny the transaction). In some implementations, the input options may be verbal (e.g., the user may speak into a microphone of the user device and indicate whether the transaction is confirmed or denied).

The user may provide an input, to the user device, indicating whether the transaction is confirmed or denied. For example, the user may provide the input via a user interface of the user device or may verbally provide the input (e.g., to a microphone of the user device). As shown by reference number 126, the user device may transmit, to the fraud notification platform, a response indicating whether the transaction is confirmed or denied based on the input provided by the user. Additionally, in some implementations, the user device may transmit user device location information (e.g., indicating a location of the user device). The user device location information may indicate a location (e.g., a geographic location and/or geographic coordinates) of the user device at the time when the response is transmitted by the user device (e.g., at the time when the input is provided to the user device). Therefore, the user device location information may indicate a location of the user device proximate in time to when the transaction (e.g., indicated by the transaction notification) occurred, because the transaction notification is transmitted soon after (e.g., immediately after) the fraud notification platform receives the transaction information, as described in more detail above.

As shown by reference number 128, the fraud notification platform may determine whether the response is valid based on the user device location information and transaction location information. The fraud notification platform may identify the transaction location information based on the transaction information received from the transaction back-end system. The transaction location information may indicate a location at which the transaction was initiated. For example, the transaction location information may indicate a location of the transaction terminal (e.g., for in person transactions and/or card present transactions). In some implementations, the transaction location information may indicate a location of a device used to initiate the transaction (e.g., for online transactions and/or card not present transactions). For example, the transaction information may indicate an identifier or an address of the device used to initiate the transaction, such as an Internet Protocol (IP) address. The fraud notification platform may determine the transaction location information based on the identifier or address of the device used to initiate the transaction (e.g., based on the IP address of the device).

The fraud notification platform may determine a distance between the user device location (e.g., indicated by the user device location information) and the transaction location (e.g., indicated by the transaction location information). In some implementations, the fraud notification platform may determine whether the response, from the user device, is valid based on the distance between the user device location and the transaction location. For example, the fraud notification platform may compare the distance to a threshold. Based on the response and comparing the distance to the threshold, the fraud notification platform may determine whether the response, from the user device, is valid. For example, if the response indicates that the transaction is denied (e.g., that the transaction is fraudulent) and the distance satisfies a threshold distance or proximity threshold (e.g., indicating that the user device location and the transaction location are close together), then the fraud notification platform may determine that the response is not valid. That is, because the user device was in the same (or near the) location of the transaction at approximately the same time that the transaction occurred, the fraud notification platform may determine that a response indicating that the transaction is fraudulent is not valid. If the response indicates that the transaction is denied (e.g., that the transaction is fraudulent) and the distance does not satisfy the threshold distance (e.g., indicating that the user device location and the transaction location are far apart), then the fraud notification platform may determine that the response is valid.

In some implementations, if the response indicates that the transaction is confirmed (e.g., that the transaction is not fraudulent) and the distance does not satisfy the threshold distance (e.g., indicating that the user device location and the transaction location are far apart), then the fraud notification platform may determine that the response is not valid (e.g., since the user device is not located near the transaction location). If the response indicates that the transaction is confirmed (e.g., that the transaction is not fraudulent) and the distance satisfies the threshold distance (e.g., indicating that the user device location and the transaction location are close together), then the fraud notification platform may determine that the response is valid.

In some implementations, if the fraud notification platform determines that the response is not valid, then the fraud notification platform may transmit an indication, to the user device, that the response has not been accepted (e.g., is not valid). In some implementations, the indication that the response has not been accepted may indicate that the response has not been accepted due to the user device location. The user device may display or provide an indication that the response has not been accepted. By providing the indication that the response has not been accepted, the user may be enabled to provide additional information to the fraud notification platform (or another device associated with the same institution as the fraud notification platform) supporting the user's input confirming or denying the transaction.

In some implementations, the fraud notification platform may determine whether the response is received within a threshold amount of time from transmitting the transaction notification. For example, upon transmitting the transaction notification, the fraud notification platform may initiate a timer that corresponds to the threshold amount of time. The fraud notification platform may determine whether the response is received prior to the timer expiring. The timer may ensure that the fraud notification platform only determines the validity of a response based on location, as described above, that is transmitted proximate in time to when the transaction notification is transmitted. As the user device may be a mobile device, the user device may be in a location near the transaction location when the transaction notification is transmitted, but if a response is not input to the user device until a later time, the user device location may no longer be near the transaction location. As a result, if the fraud notification platform were to determine the validity of response based on location, as described above, then the fraud notification platform may incorrectly determine the validity of the response. Therefore, the timer may improve the accuracy of the determination of the validity of a response received by the fraud notification platform.

In this way, the fraud notification platform may identify when a user is attempting to deceive the fraud notification platform (e.g., by falsely indicating that a transaction is fraudulent) and/or when a fraudulent actor is attempting to confirm a fraudulent transaction. This may improve the fraud notification platform's ability to identify a fraudulent transaction and/or to update the fraud model in real time, as described in more detail below. The fraud notification platform may determine whether the transaction is fraudulent based on the response and the determination of whether the response is valid. For example, if the fraud notification platform determines that the response is valid (or is unable to determine whether the response is valid due to the timer expiring), then the fraud notification platform may determine whether the transaction is fraudulent based on the response. In some implementations, if the fraud notification platform is unable to determine whether the response is valid due to the timer expiring, then the fraud notification platform may determine whether the transaction is fraudulent based on the fraud score (e.g., determined by the output of the fraud model, as described above).

In some implementations, if the fraud notification platform determines that the response is not valid, then the fraud notification platform may determine whether the transaction is fraudulent based on the fraud score and/or the response. For example, if the response indicates that a transaction is fraudulent and the response is determined to be not valid, then the fraud notification platform may determine that the transaction is not fraudulent (e.g., if the fraud score does not satisfy the fraud threshold).

In some implementations, the fraud notification platform may perform one or more actions based on determining that the transaction (e.g., that was completed) is fraudulent. In some implementations, the action may include remedying, removing the transaction from a transaction log or record, reversing, and/or refunding the fraudulent transaction. In some implementations, the fraud notification platform may transmit an indication to an entity (e.g., merchant and/or retailer) associated with the transaction that notifies the entity of the fraudulent transaction. In some implementations, the fraud notification platform may transmit an indication to a law enforcement agency that notifies the law enforcement agency of the fraudulent transaction. Because the actions or steps described above (e.g., transmitting the transaction notification, receiving the response, and/or determining whether the transaction is fraudulent) may occur directly or soon after the transaction is completed, transmitting the indication of the fraudulent transaction (e.g., to the entity and/or law enforcement agency) may enable the fraudulent actor to be apprehended (e.g., as the fraudulent actor may still be in the transaction location). For example, the entity associated with the transaction may be enabled to immediately obtain security footage or information associated with the transaction to increase a likelihood that the fraudulent actor is apprehended. Moreover, the indication of the fraudulent transaction may enable the entity and/or law enforcement agency to improve security and reduce a likelihood of similar fraudulent transactions in the future.

Figure 1D:
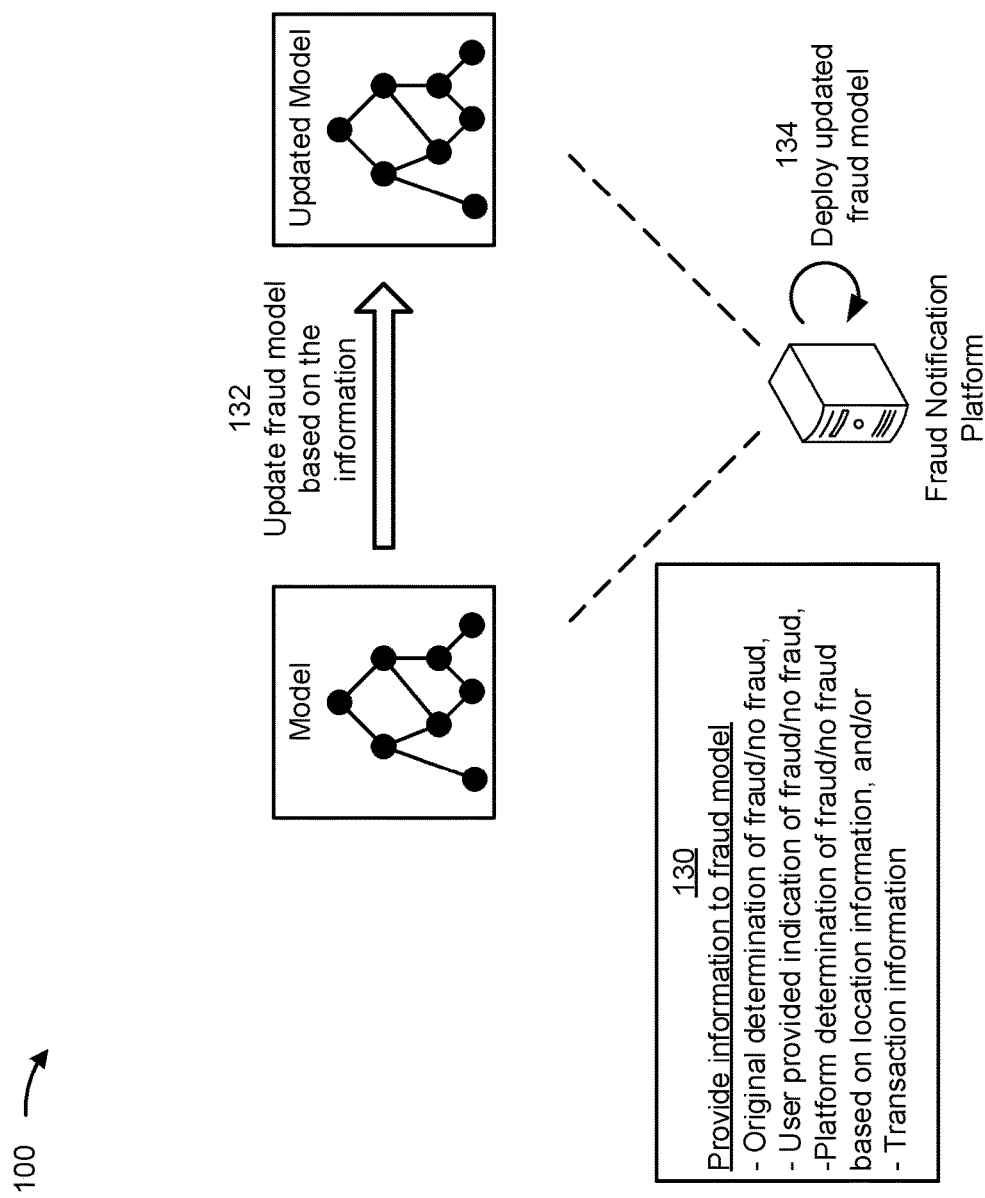

As shown in FIG. 1D, the fraud notification platform may cause the fraud model to be updated in real time. For example, as shown by reference number 130, the fraud notification platform may provide information to the fraud model to update the fraud model. The information provided to the fraud model may include the original output of the fraud model (e.g., fraud score) indicating the likelihood that the transaction is fraudulent, the response from the user device confirming or denying the transaction, the fraud notification platform determination of whether the transaction is fraudulent (e.g., based on the response and/or based on whether the response is valid, as described above), the user device location information, the transaction location information, an identifier of an entity (e.g., a merchant) associated with the transaction, and/or transaction information associated with the transaction, among other examples.

In some implementations, the fraud notification platform may add the information to a data stream (e.g., an event stream) that can be provided to the fraud model in real time. A data stream may be a sequence of digitally encoded coherent signals (packets of data or data packets) used to transmit or receive information that is in the process of being transmitted (e.g., a data stream may include data that is generated continuously by many (e.g., hundreds or thousands) of data sources, which typically send in the data records simultaneously). The fraud notification may update a data stream by logging the information to be provided to the fraud model in the data stream. In this way, the data stream (e.g., and the information to be provided to the fraud model) may be fed back or provided to the fraud model in real time.

As shown by reference number 132, the fraud notification platform may cause the fraud model to be updated based on the information provided to the fraud model. For example, the fraud model can be trained using the information as an input to the fraud model with an indication of fraud or no fraud as a target output of the fraud model. Training the fraud model (e.g., the machine learning model) is described in more detail below in connection with FIG. 2.

As shown by reference number 134, the fraud notification platform may cause the updated or trained fraud model to be deployed. For example, the fraud notification platform may apply the updated or trained fraud model to one or more future transactions in a similar manner as described above. In this way, the fraud notification platform may update the fraud model in real time (e.g., based on the real time user device feedback and/or based on a determination of whether the user device feedback is valid) and may apply the updated fraud model immediately to future transactions. This improves security of transactions associated with the fraud notification platform (e.g., with an institution associated with the fraud notification platform) by applying an improved and more accurate fraud model to the transactions.

As indicated above, FIGS. 1A-1D are provided as an example. Other examples may differ from what is described with regard to FIGS. 1A-1D.

Figure 2:
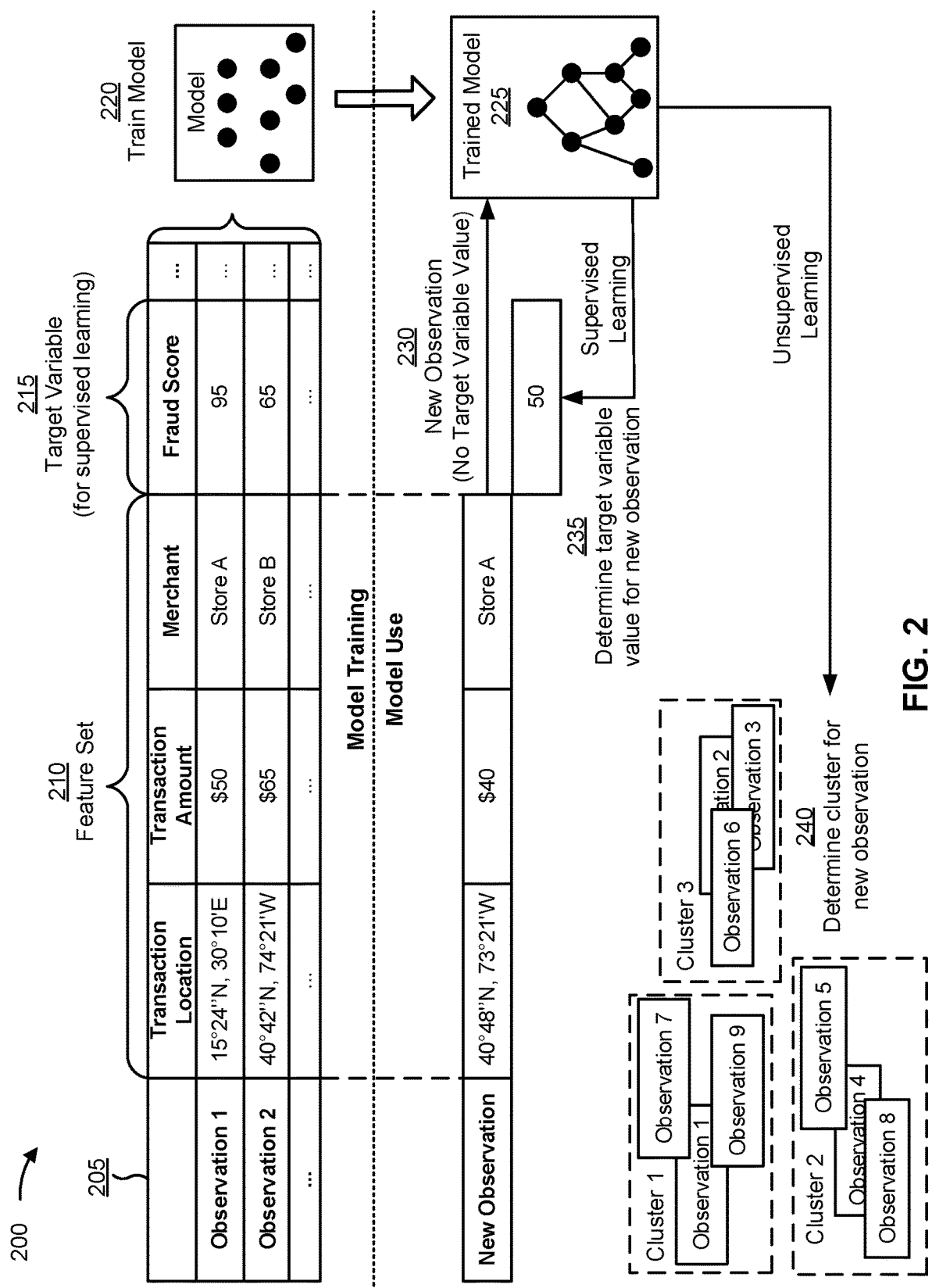
FIG. 2 is a diagram illustrating an example 200 of training and using a machine learning model in connection with real-time updating of a security model

FIG. 2 is a diagram illustrating an example 200 of training and using a machine learning model in connection with real-time updating of a security model. The machine learning model training and usage described herein may be performed using a machine learning system. The machine learning system may include or may be included in a computing device, a server, a cloud computing environment, or the like, such as the fraud notification platform described in more detail elsewhere herein.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) from the fraud notification platform and/or a transaction backend system, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the fraud notification platform and/or the transaction backend system. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of transaction location, a second feature of transaction amount, a third feature of merchant, and so on. As shown, for a first observation, the first feature may have a value of 15 degrees, 24 minutes North and 30 degrees, 10 minutes East, the second feature may have a value of $50, the third feature may have a value of Store A, and so on. These features and feature values are provided as examples, and may differ in other examples. For example, the feature set may include one or more of the following features: user device location, transaction category, transaction time, and/or a credential used to initiate the transaction, among other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiple classes, classifications, or labels) and/or may represent a variable having a Boolean value. A target variable may be associated with a target variable value, and a target variable value may be specific to an observation. In example 200, the target variable is fraud score, which has a value of 95 for the first observation. The fraud score may be compared to a threshold (e.g., by the fraud notification platform as described above) to determine if a transaction is fraudulent. For example, a higher fraud score may indicate a higher likelihood of fraud.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of transaction location, a second feature of transaction amount, a third feature of merchant, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of 50 for the target variable of fraud score for the new observation, as shown by reference number 235. Based on this prediction, the machine learning system may provide a first recommendation, may provide output for determination of a first recommendation, may perform a first automated action, and/or may cause a first automated action to be performed (e.g., by instructing another device to perform the automated action), among other examples. The first recommendation may include, for example, approve the transaction and transmit a transaction notification to a user device associated with the transaction.

The first automated action may include, for example, causing the transaction to be completed and/or transmitting the transaction notification.

As another example, if the machine learning system were to predict a value of 85 for the target variable of fraud score, then the machine learning system may provide a second (e.g., different) recommendation (e.g., deny the transaction and send the transaction notification) and/or may perform or cause performance of a second (e.g., different) automated action (e.g., causing the transaction to be denied and/or transmitting the transaction notification). As another example, if the machine learning system were to predict a value of 15 for the target variable of fraud score, then the machine learning system may provide a third (e.g., different) recommendation (e.g., approve the transaction and refrain from sending the transaction notification) and/or may perform or cause performance of a third (e.g., different) automated action (e.g., causing the transaction to be completed).

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a cluster of observations that indicate potential fraud, such as observations having a fraud score that satisfies a first threshold but does not satisfy a second threshold), then the machine learning system may provide a first recommendation, such as the first recommendation described above. Additionally, or alternatively, the machine learning system may perform a first automated action and/or may cause a first automated action to be performed (e.g., by instructing another device to perform the automated action) based on classifying the new observation in the first cluster, such as the first automated action described above.

As another example, if the machine learning system were to classify the new observation in a second cluster (e.g., a cluster of observations that indicate fraud, such as observations having a fraud score that satisfies the second threshold), then the machine learning system may provide a second (e.g., different) recommendation (e.g., the second recommendation described above) and/or may perform or cause performance of a second (e.g., different) automated action, such as the second automated action described above.

In some implementations, the recommendation and/or the automated action associated with the new observation may be based on a target variable value having a particular label (e.g., classification or categorization), may be based on whether a target variable value satisfies one or more thresholds (e.g., whether the target variable value is greater than a threshold, is less than a threshold, is equal to a threshold, falls within a range of threshold values, or the like), and/or may be based on a cluster in which the new observation is classified.

In this way, the machine learning system may apply a rigorous and automated process to determine a likelihood that a transaction is fraudulent. The machine learning system enables recognition and/or identification of tens, hundreds, thousands, or millions of features and/or feature values for tens, hundreds, thousands, or millions of observations, thereby increasing accuracy and consistency and reducing delay associated with determining a likelihood that a transaction is fraudulent relative to requiring computing resources to be allocated for tens, hundreds, or thousands of operators to manually determine a likelihood that a transaction is fraudulent using the features or feature values.

As indicated above, FIG. 2 is provided as an example. Other examples may differ from what is described in connection with FIG. 2.

Figure 3:
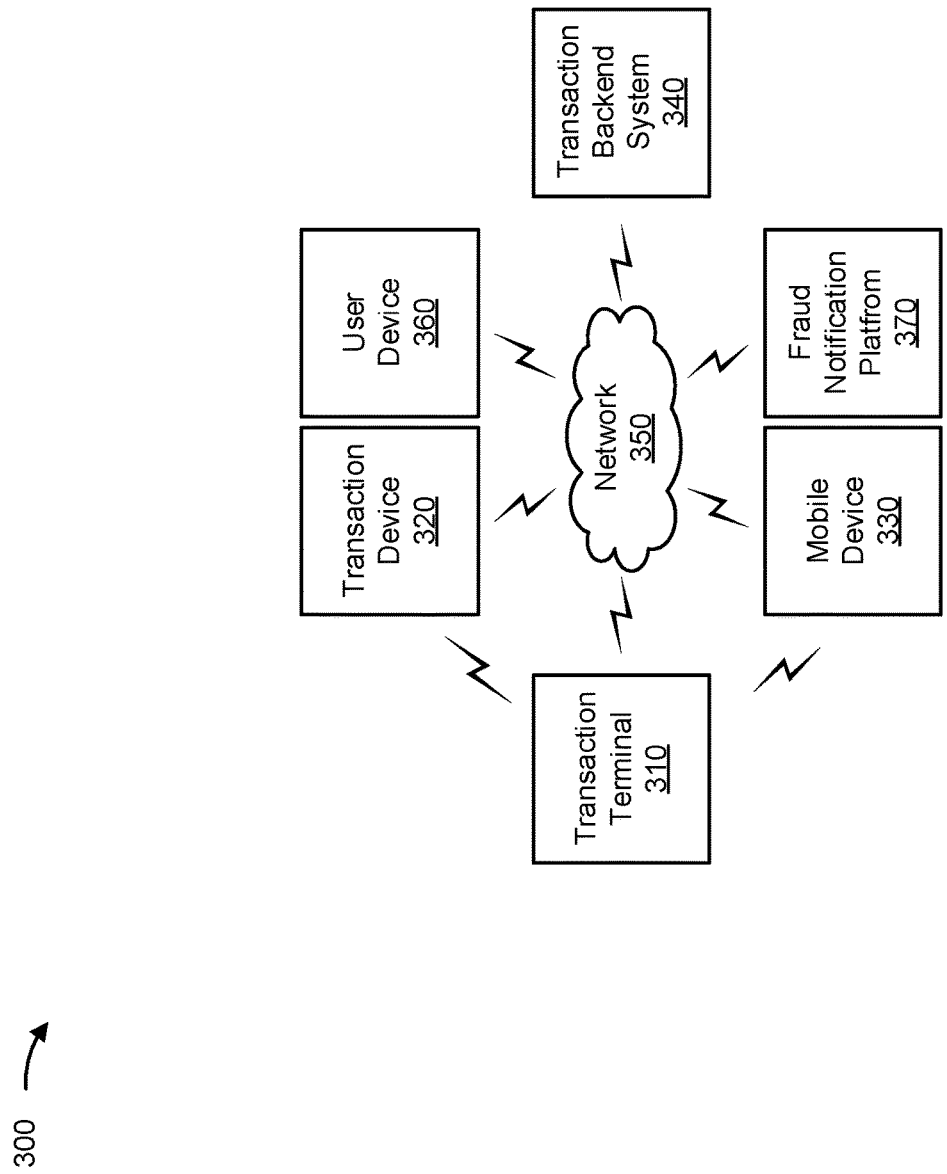
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a transaction terminal 310, a transaction device 320, a mobile device 330, a transaction backend system 340, a network 350, a user device 360, and/or a fraud notification platform 370. Devices of environment 300 may interconnect via wired connections and/or wireless connections.

The transaction terminal 310 includes one or more devices capable of facilitating an electronic transaction associated with the transaction device 320. For example, the transaction terminal 310 may include a point-of-sale (PoS) terminal, a payment terminal (e.g., a credit card terminal, a contactless payment terminal, a mobile credit card reader, or a chip reader), and/or an automated teller machine (ATM). The transaction terminal 310 may include one or more input components and/or one or more output components to facilitate obtaining data (e.g., account information) from the transaction device 320 and/or to facilitate interaction with and/or authorization from an owner or accountholder of the transaction device 320. Example input components of the transaction terminal 310 include a number keypad, a touchscreen, a magnetic stripe reader, a chip reader, and/or a radio frequency (RF) signal reader (e.g., a near-field communication (NFC) reader). Example output devices of transaction terminal 310 include a display and/or a speaker.

The transaction device 320 includes one or more devices capable of being used for an electronic transaction. In some implementations, the transaction device 320 includes a transaction card (or another physical medium with integrated circuitry) capable of storing and communicating account information, such as a credit card, a debit card, a gift card, an ATM card, a transit card, a fare card, and/or an access card. In some implementations, the transaction device 320 may be the mobile device 330 or may be integrated into the mobile device 330. For example, the mobile device 330 may execute an electronic payment application capable of performing functions of the transaction device 320 described herein. Thus, one or more operations described herein as being performed by the transaction device 320 may be performed by a transaction card, the mobile device 330, or a combination thereof.

The transaction device 320 may store account information associated with the transaction device 320, which may be used in connection with an electronic transaction facilitated by the transaction terminal 310. The account information may include, for example, an account identifier that identifies an account (e.g., a bank account or a credit account) associated with the transaction device 320 (e.g., an account number, a card number, a bank routing number, and/or a bank identifier), a cardholder identifier (e.g., identifying a name of a person, business, or entity associated with the account or the transaction device 320), expiration information (e.g., identifying an expiration month and/or an expiration year associated with the transaction device 320), and/or a credential (e.g., a payment token). In some implementations, the transaction device 320 may store the account information in tamper-resistant memory of the transaction device 320, such as in a secure element. As part of performing an electronic transaction, the transaction device 320 may transmit the account information to the transaction terminal 310 using a communication component, such as a magnetic stripe, an integrated circuit (IC) chip (e.g., a EUROPAY®, MASTERCARD®, VISA® (EMV) chip), and/or a contactless communication component (e.g., an NFC component, an RF component, a Bluetooth component, and/or a Bluetooth Low Energy (BLE) component). Thus, the transaction device 320 and the transaction terminal 310 may communicate with one another by coming into contact with one another (e.g., using a magnetic stripe or an EMV chip) or via contactless communication (e.g., using NFC).

The mobile device 330 includes one or more devices capable of being used for an electronic transaction, as described above in connection with the transaction device 320. The mobile device 330 may include a communication device and/or a computing device. For example, the mobile device 330 may include a wireless communication device, a mobile phone, a user equipment, a tablet computer, a wearable communication device (e.g., a smart wristwatch, a pair of smart eyeglasses, a head mounted display, or a virtual reality headset), or a similar type of device. Additionally, or alternatively, the mobile device 330 may be capable of receiving, generating, storing, processing, and/or providing information associated with real-time updating of a security model, as described elsewhere herein.

The transaction backend system 340 includes one or more devices capable of processing, authorizing, and/or facilitating a transaction. For example, the transaction backend system 340 may include one or more servers and/or computing hardware (e.g., in a cloud computing environment or separate from a cloud computing environment) configured to receive and/or store information associated with processing an electronic transaction. The transaction backend system 340 may process a transaction, such as to approve (e.g., permit, authorize, or the like) or decline (e.g., reject, deny, or the like) the transaction and/or to complete the transaction if the transaction is approved. The transaction backend system 340 may process the transaction based on information received from the transaction terminal 310, such as transaction data (e.g., information that identifies a transaction amount, a merchant, a time of a transaction, a location of the transaction, or the like), account information communicated to the transaction terminal 310 by the transaction device 320, and/or information stored by the transaction backend system 340 (e.g., for fraud detection).

The transaction backend system 340 may be associated with a financial institution (e.g., a bank, a lender, a credit card company, or a credit union) and/or may be associated with a transaction card association that authorizes a transaction and/or facilitates a transfer of funds. For example, the transaction backend system 340 may be associated with an issuing bank associated with the transaction device 320, an acquiring bank (or merchant bank) associated with the merchant and/or the transaction terminal 310, and/or a transaction card association (e.g., VISA® or MASTERCARD®) associated with the transaction device 320. Based on receiving information associated with the transaction device 320 from the transaction terminal 310, one or more devices of the transaction backend system 340 may communicate to authorize a transaction and/or to transfer funds from an account associated with the transaction device 320 to an account of an entity (e.g., a merchant) associated with the transaction terminal 310.

The network 350 includes one or more wired and/or wireless networks. For example, the network 350 may include a cellular network, a public land mobile network, a local area network, a wide area network, a metropolitan area network, a telephone network, a private network, the Internet, and/or a combination of these or other types of networks. The network 350 enables communication among the devices of environment 300. In some implementations, the transaction terminal 310 may communicate with the transaction device 320 using a first network (e.g., a contactless network or by coming into contact with the transaction device 320) and may communicate with the transaction backend system 340 using a second network.

The user device 360 includes one or more devices capable of receiving, generating, storing, processing, and/or providing information associated with real-time updating of a security model, as described elsewhere herein. The user device 360 may include a communication device and/or a computing device. For example, the user device 360 may include a wireless communication device, a mobile phone, a user equipment, a laptop computer, a tablet computer, a desktop computer, a set-top box, a wearable communication device (e.g., a smart wristwatch, a pair of smart eyeglasses, a head mounted display, or a virtual reality headset), or a similar type of device.

The fraud notification platform 370 includes one or more devices capable of receiving, generating, storing, processing, providing, and/or routing information associated with real-time updating of a security model, as described elsewhere herein. The fraud notification platform 370 may include a communication device and/or a computing device. For example, the fraud notification platform 370 may include a server, such as an application server, a client server, a web server, a database server, a host server, a proxy server, a virtual server (e.g., executing on computing hardware), or a server in a cloud computing system. In some implementations, the fraud notification platform 370 includes computing hardware used in a cloud computing environment.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
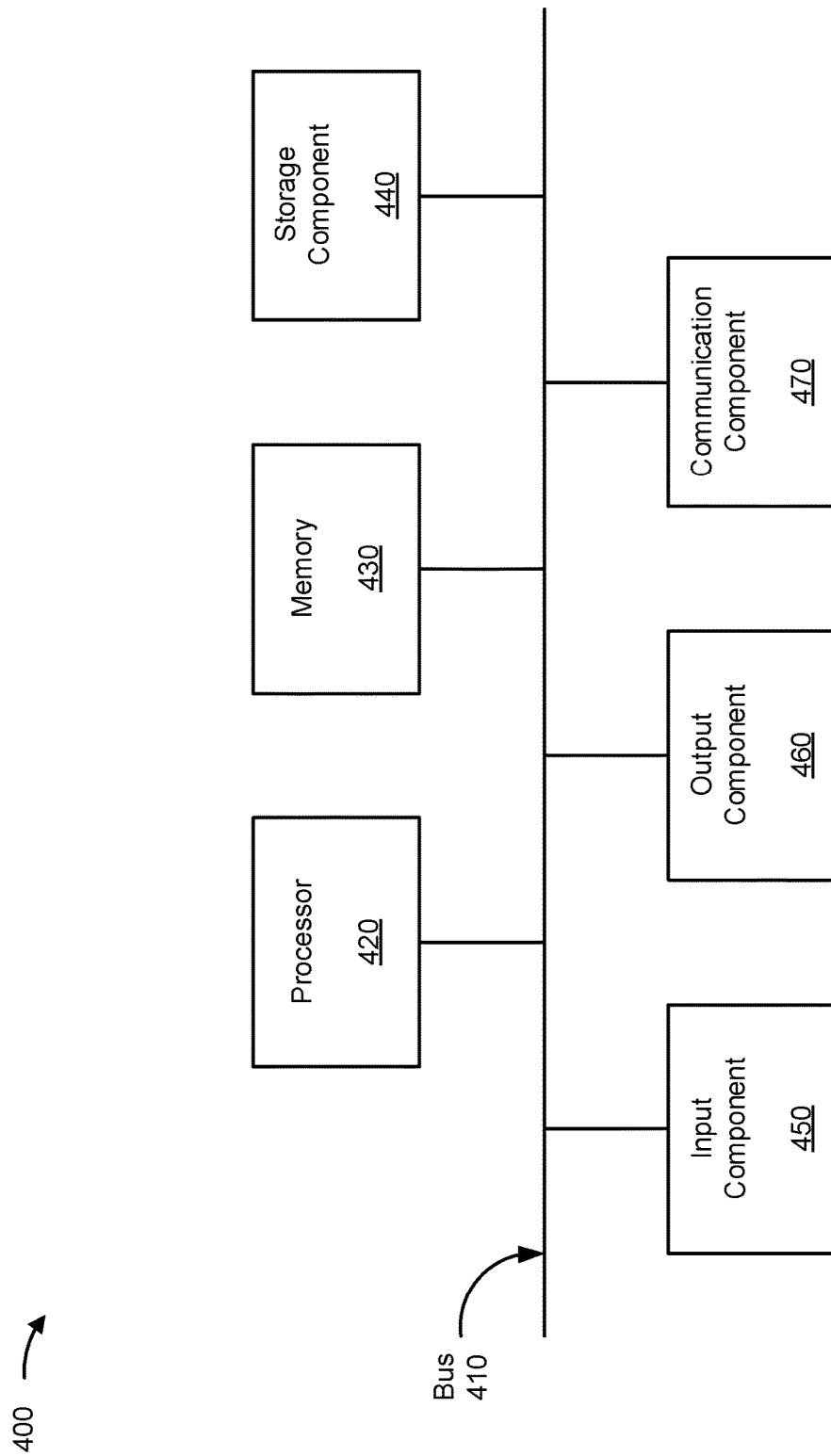
FIG. 4 is a diagram of example components of one or more devices of FIG. 3.

FIG. 4 is a diagram of example components of a device 400, which may correspond to transaction terminal 310, transaction device 320, mobile device 330, transaction backend system 340, user device 360, and/or fraud notification platform 370. In some implementations, transaction terminal 310, transaction device 320, mobile device 330, transaction backend system 340, user device 360, and/or fraud notification platform 370 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory, a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, and/or an actuator. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, and/or an antenna.

Device 400 may perform one or more processes described herein. For example, a non-transitory computer-readable medium (e.g., memory 430 and/or storage component 440) may store a set of instructions (e.g., one or more instructions, code, software code, and/or program code) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
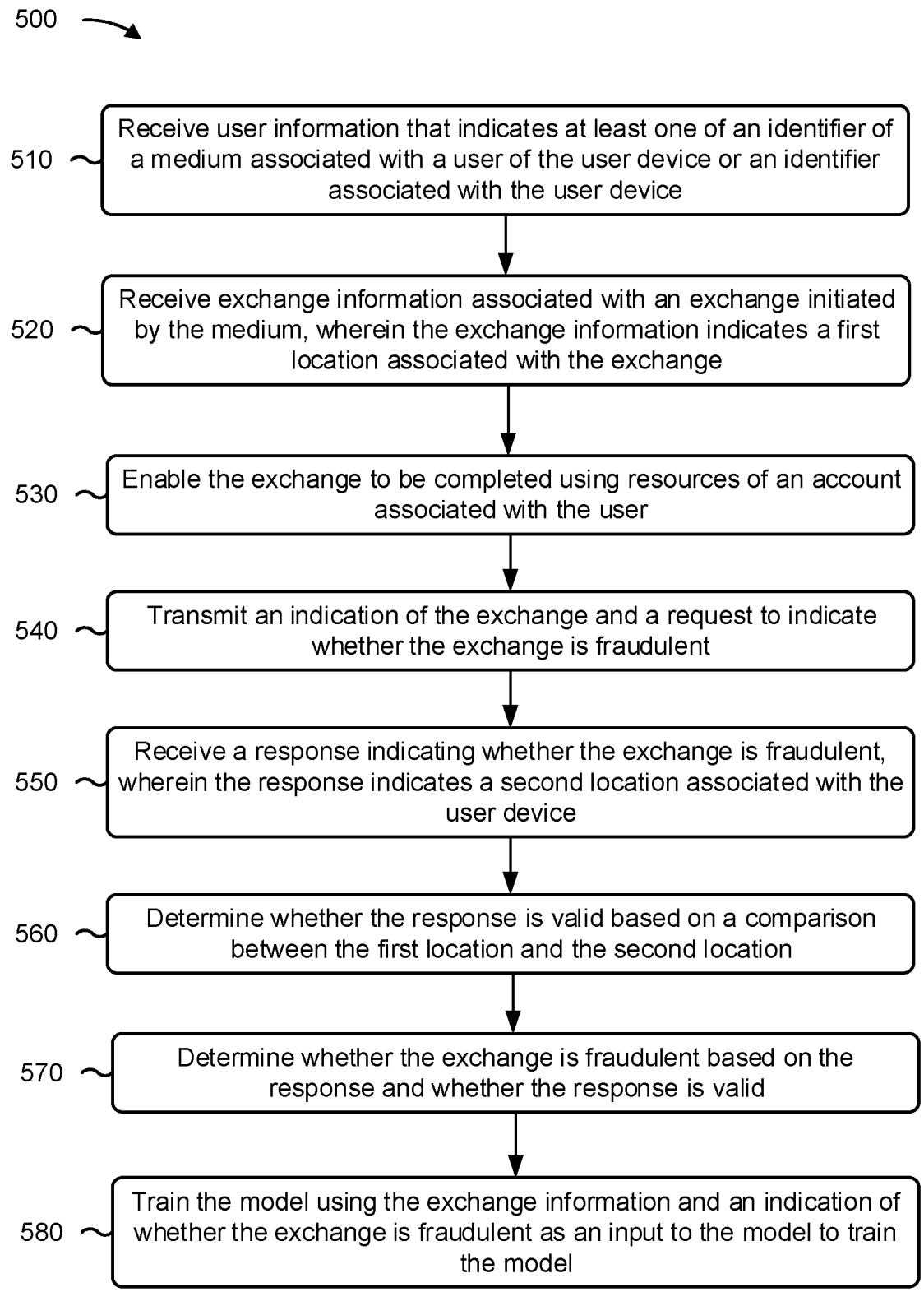
FIG. 5 is a flowchart of an example process relating to real-time updating of a security model.

FIG. 5 is a flowchart of an example process 500 associated with real-time updating of a security model. In some implementations, one or more process blocks of FIG. 5 may be performed by a device (e.g., a server device or fraud notification platform 370). In some implementations, one or more process blocks of FIG. 5 may be performed by another device or a group of devices separate from or including the device, such as transaction terminal 310, transaction device 320, mobile device 330, transaction backend system 340, and/or user device 360. Additionally, or alternatively, one or more process blocks of FIG. 5 may be performed by one or more components of device 400, such as processor 420, memory 430, storage component 440, input component 450, output component 460, and/or communication component 470.

As shown in FIG. 5, process 500 may include receiving, from a user device, user information that indicates at least one of an identifier of a medium associated with a user of the user device or an identifier associated with the user device (block 510). As further shown in FIG. 5, process 500 may include receiving exchange information associated with an exchange initiated by the medium (block 520). In some implementations, the exchange information indicates a first location associated with the exchange. As further shown in FIG. 5, process 500 may include enabling the exchange to be completed using resources of an account associated with the user (block 530). As further shown in FIG. 5, process 500 may include transmitting, to the user device, an indication of the exchange and a request to indicate whether the exchange is fraudulent (block 540). As further shown in FIG. 5, process 500 may include receiving, from the user device, a response indicating whether the exchange is fraudulent (block 550). In some implementations, the response indicates a second location associated with the user device. As further shown in FIG. 5, process 500 may include determining whether the response is valid based on a comparison between the first location and the second location (block 560). As further shown in FIG. 5, process 500 may include determining whether the exchange is fraudulent based on the response and whether the response is valid (block 570). As further shown in FIG. 5, process 500 may include training the model using the exchange information and an indication of whether the exchange is fraudulent as an input to the model to train the model (block 580).

In some implementations, process 500 may include performing one or more actions based on training the model and/or based on determining that the exchange is fraudulent. For example, the one or more actions may include deploying the trained model to be applied to one or more future exchanges, issuing a refund to the account associated with the medium for the exchange, removing the exchange information from a record associated with the account associated with the user, and/or transmitting, to an entity associated with the exchange or a law enforcement agency, at least one of the exchange information or an indication that the exchange is fraudulent, among other examples.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A fraud notification platform for updating a security model using real-time feedback from a user device, the platform comprising:
   one or more non-transitory memories configured to store instructions and data; and
   one or more processors, coupled to the one or more memories, configured to execute the instructions to:
      receive, from the user device, user data that indicates at least one of a credential of a card associated with a user of the user device or an identifier associated with the user device;
      receive an indication of an exchange initiated using the credential of the card associated with the user data, wherein the indication identifies exchange data associated with the exchange;
      determine, using the security model, a score associated with the exchange based on the exchange data, wherein the score indicates a likelihood that the exchange is valid, wherein the security model comprises a machine learning model trained using real-time feedback and location data to enhance fraud detection accuracy;
      transmit, to the user device, a notification based on the score satisfying a first threshold,
         wherein the notification requests an indication of whether the exchange is valid regardless of whether the score satisfies a second threshold that is higher than the first threshold, wherein the exchange is enabled to be completed in instances where the score satisfies the first threshold and does not satisfy the second threshold;
      receive, from the user device, a response to the notification indicating whether the exchange is valid, wherein the response indicates user device location information associated with the user device;
      compare a user device location indicated by the user device location information with an exchange location indicated by the exchange data, wherein the exchange location comprises geographic coordinates associated with the exchange;
      determine whether the response is valid based on comparing the user device location and the exchange location; and
      update the security model in real-time using an initial determination of the score and an indication of whether the exchange is valid that is based on the response to the notification and whether the response is valid, wherein the updating includes dynamically adjusting model parameters to improve fraud detection accuracy and system security by deploying and training the security model.

2. The fraud notification platform of claim 1, wherein the one or more processors are further configured to:
   perform an action if the response to the notification indicates that the exchange is not valid, wherein the action includes:
      transmitting, to an entity associated with the exchange, at least one of the exchange data or an indication that the exchange is not valid.

3. The fraud notification platform of claim 1, wherein the one or more processors, when transmitting, to the user device, the notification, are configured to:
   transmit, to the user device, at least one of:
      an instruction for the user device to provide haptic feedback indicating the exchange,
      an instruction, to an application executing on the user device, to provide the notification for display on the user device,
      a short message service message indicating the notification, or
      a voice call indicating the notification.

4. The fraud notification platform of claim 1, wherein the response to the notification indicates that the exchange is not valid, and wherein the one or more processors, when determining whether the response is valid, are configured to:
   identify the exchange location associated with the exchange based on the exchange data;
   identify the user device location associated with the user device at a time when the user device transmitted the response to the notification based on the response to the notification; and
   determine whether the response is valid based on whether a distance between the exchange location and the user device location satisfies a proximity threshold;
   wherein the one or more processors, when updating the security model, are configured to:
      provide an indication that the exchange is valid if the distance between the exchange location and the user device location satisfies the proximity threshold; or
      provide an indication that the exchange is not valid if the distance between the exchange location and the user device location does not satisfy the proximity threshold.

5. The fraud notification platform of claim 1, wherein the one or more processors are further configured to:
   identify the exchange location based on at least one of:
      location information associated with a physical location of an entity associated with the exchange, or an internet protocol address of a device used to initiate the exchange.

6. The fraud notification platform of claim 1, wherein the one or more processors, when updating the security model, are configured to:
   add the exchange data and the indication of whether the exchange is valid to a data stream; and
   provide the data stream to the security model.

7. The fraud notification platform of claim 1, wherein the one or more processors are further configured to:
   determine, using the security model, a score indicating a fraud likelihood associated with the exchange; and
   enable the exchange to be completed based on determining that the score satisfies the first threshold and does not satisfy the second threshold.

8. The fraud notification platform of claim 1, wherein the one or more processors are further configured to:
   transmit, to the user device, an indication that the response received by the user device is not valid based on the location of the user device at a particular time.

9. The fraud notification platform of claim 1, wherein the one or more processors are further configured to:
   perform an action if the exchange is determined to be fraudulent, wherein the action includes at least one of:
      removing the exchange information from a record associated with an account associated with the user, or
      transmitting, to an entity associated with the exchange, at least one of the exchange information or an indication that the exchange is fraudulent.

10. A method performed by a fraud notification platform for updating a machine learning model using real-time exchange information, the method comprising:
   receiving, from a user device, user information that indicates at least one of an identifier of a medium associated with a user of the user device or an identifier associated with the user device;
   receiving, exchange information associated with an exchange initiated by the medium, wherein the exchange information indicates a first location associated with the exchange, wherein the first location comprises geographic coordinates associated with a location at which the exchange was initiated;
   enabling the exchange to be completed using resources of an account associated with the user in instances where a fraud score corresponding to the exchange does not satisfy a fraud threshold;
   transmitting, to the user device, an indication of the exchange and a request to indicate whether the exchange is fraudulent in instances where the exchange satisfies a notification threshold and not the fraud threshold, the notification threshold being lower than the fraud threshold;
   receiving, from the user device, a response indicating whether the exchange is fraudulent, wherein the response indicates a second location associated with the user device;
   determining whether the response is valid based on a comparison between the first location and the second location;
   determining whether the exchange is fraudulent based on the response and whether the response is valid; and
   training the machine learning model using an initial determination of the fraud score and an indication of whether the exchange is fraudulent as an input to the machine learning model to train the machine learning model in real-time, thereby enhancing fraud detection accuracy and system security by deploying and updating the security model.

11. The method of claim 10, wherein transmitting the indication of the exchange and the request to indicate whether the exchange is fraudulent comprises:
   applying the machine learning model to the exchange information;
   determining that the exchange has a likelihood to be fraudulent based on an output of the machine learning model; and
   transmitting the indication of the exchange and the request to indicate whether the exchange is fraudulent based on determining that the exchange has a likelihood to be fraudulent.

12. The method of claim 10, further comprising:
   deploying the trained machine learning model to be applied to one or more future exchanges.

13. The method of claim 10, wherein determining whether the response is valid comprises:
   identifying that the response indicates that the exchange is fraudulent;
   determining whether a distance between the first location and the second location satisfies a threshold; and
   determining whether the response is valid based on whether the distance between the first location and the second location satisfies the threshold.

14. The method of claim 10, wherein enabling the exchange to be completed using resources of the account associated with the user comprises:
   determining, using the machine learning model, a score indicating a fraud likelihood associated with the exchange; and
   enabling the exchange to be completed based on determining that the score satisfies the notification threshold and does not satisfy the fraud threshold.

15. The method of claim 10, further comprising:
   identifying the first location based on at least one of:
      location information associated with a terminal of an entity associated with the exchange, or
      location information of a device used to initiate the exchange.

16. The method of claim 10, wherein transmitting the indication of the exchange and the request to indicate whether the exchange is fraudulent comprises:
   determining a first time at which the exchange information is received; and
   transmitting the indication of the exchange and the request to indicate whether the exchange is fraudulent at a second time, wherein the second time is within a threshold amount of time from the first time.

17. A non-transitory computer-readable medium storing a set of instructions, the set of instructions comprising:
   one or more instructions that, when executed by one or more processors of a user device, cause the user device to:
      transmit, to a server, an indication of a credential of a card associated with a user of the user device;
      receive, from the server, an indication of an exchange that was completed using the credential of the card, wherein a fraud score associated with the exchange satisfies a notification threshold and not a fraud threshold, and wherein the fraud score is determined using a machine learning model;

provide feedback indicating the exchange regardless of whether the fraud score satisfies the fraud threshold, wherein the feedback includes:
haptic feedback, and
a notification that indicates the exchange and a request to confirm or deny the exchange, wherein the exchange is enabled to be completed in instances where the fraud score satisfies the notification threshold and not the fraud threshold;
receive an input at a particular time, wherein the input indicates the exchange is confirmed or denied based on providing the feedback;
determine a location of the user device, wherein the location of the user device corresponds to a set of geographic coordinates, and wherein the set of geographic coordinates specify where the user device was located at the particular time; and
update the machine learning model using an indication of whether the exchange is confirmed or denied based on the input and the location of the user device for real-time user feedback validation.

18. The non-transitory computer-readable medium of claim 17, wherein the one or more instructions, when executed by the one or more processors, further cause the user device to:
initiate the exchange based on communicating with a terminal of an entity associated with the exchange.

19. The non-transitory computer-readable medium of claim 17, wherein the one or more instructions, when executed by the one or more processors, further cause the user device to:
receive, from the server, an indication that the input received by the user device is not valid based on the location of the user device at the particular time.

20. The non-transitory computer-readable medium of claim 17, wherein the one or more instructions, when executed by the one or more processors, further cause the user device to:
transmit, to the server, an indication of whether the exchange is confirmed or denied based on the input and the location of the user device at the particular time that the input is received by the user device.

* * * * *